Dec. 27, 1966     J. J. TRESS ET AL     3,294,308

REUSABLE PLASTIC CONTAINER

Filed May 14, 1965     3 Sheets-Sheet 1

INVENTORS.
JOHN J. TRESS,
FRANK E. LORDI,
DEAN C. ROGERS,
ROBERT F. KNEE.
BY Stanley J Price
their ATTORNEY.

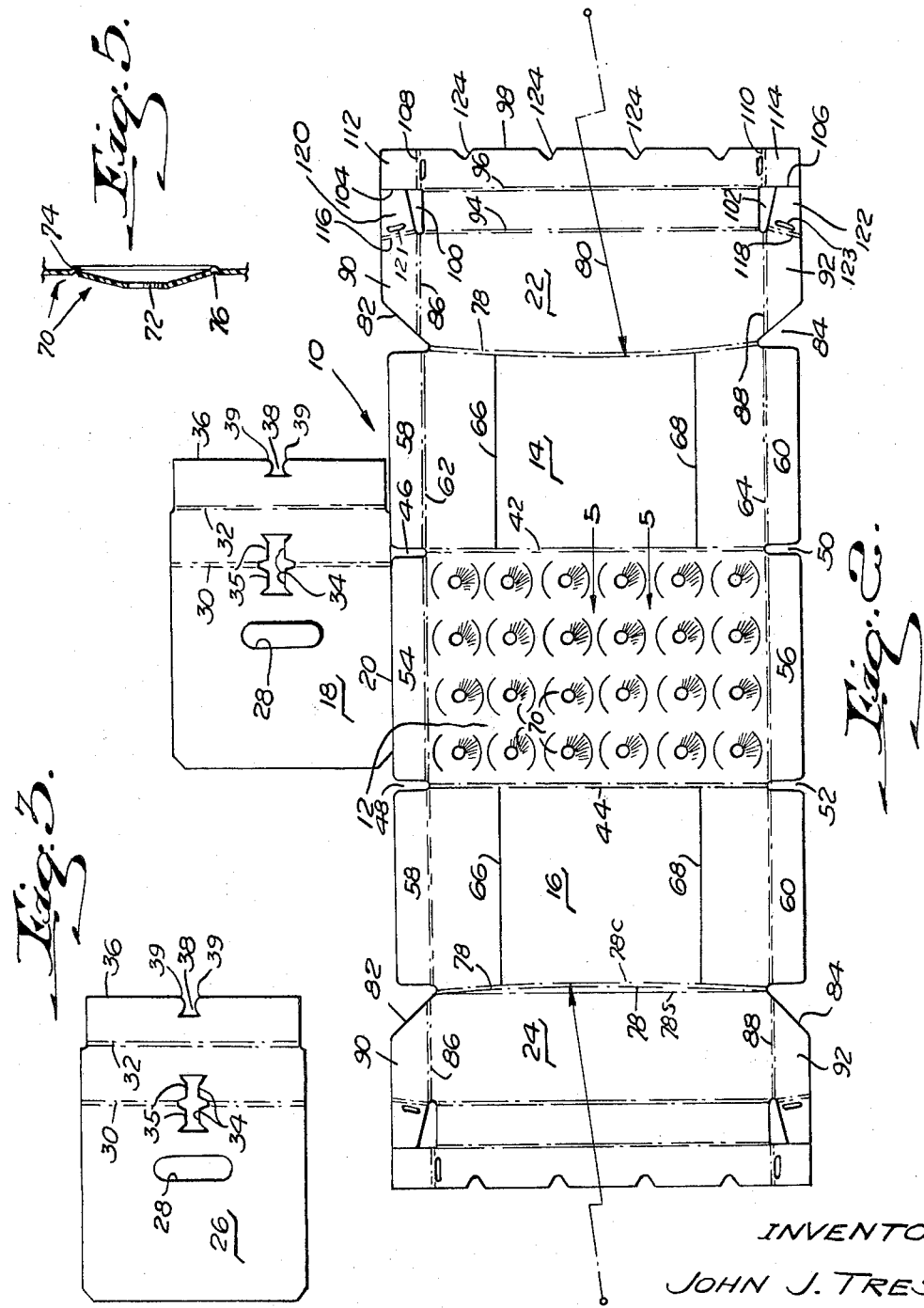

INVENTORS.
JOHN J. TRESS,
FRANK E. LORDI,
DEAN C. ROGERS &
ROBERT F. KNEE.
BY *Stanley J Price*
their ATTORNEY

United States Patent Office 3,294,308
Patented Dec. 27, 1966

3,294,308
REUSABLE PLASTIC CONTAINER
John J. Tress, Beaver Falls, and Frank E. Lordi, Dean
C. Rogers, and Robert F. Knee, Beaver, Pa., assignors
to Koppers Company, Inc., a corporation of Delaware
Filed May 14, 1965, Ser. No. 455,833
12 Claims. (Cl. 229—23)

This invention relates to a reusable container fabricated from plastic sheeting and more particularly to a reusable container fabricated from plastic sheeting useful in transporting fragile or breakable objects.

There are many advantageous features of a reusable plastic container. The plastic containers are relatively light in weight when compared with conventional wooden containers and are more durable than conventional paperboard containers and may be reused many times.

U.S. Patent No. 3,100,056 discloses a unitary molded container formed in a conventional plastic mold or press. This type of container, once formed, has a rectangular box-like shape and must be shipped or transported from the container manufacturer to the user in this rectangular box-like shape. Where there is a substantial distance between the container manufacturer and the user substantial transportation costs are incurred because of the space required to each container. Where the plastic container is fabricated from plastic sheeting the container blanks may be fabricated by the container manufacturer and shipped to the user as flat sheets. The user may store the containers as sheets and assemble the containers as needed. A substantial saving is made by both transporting and storing the containers as flat sheets.

There have been proposals in the past, as in disclosed in U.S. Patent No. 3,148,822 to Yochum, to fabricate plastic containers from plastic sheeting. Containers fabricated from plastic sheeting, while having the desired properties of durability and lightweight do not have certain other desirable properties of conventional wooden or paperboard containers. Present loading machinery customarily drops the bottles into the containers from heights of between 12″ and 18″. The plastic sheeting, although relatively flexible, is not sufficiently resilient to have good shock absorbing characteristics. Consequently, this bottles striking the bottom of containers fabricated from plastic sheeting frequently break during the automatic loading operation. Also, where plastic sheeting is utilized as dividers within the container between the fragile articles, the plastic sheeting dividers are not sufficiently resilient to serve as suitable shock absorbing means, and breakage frequently occurs during shipment.

We have discovered by debossing the bottom of the container at locations where the fragile articles are supported, that the container has sufficient resiliency to eliminate breakage of the fragile articles. The dividers between the fragile articles may also be debossed to increase their resiliency and provide suitable cushioning means between the fragile articles to prevent breakage during shipment.

Another problem encountered in fabricating reusable containers from plastic sheeting is the buckling and binding tendency of the lids because of the bowing tendency of the container side walls. Where the containers are used in automatic handling equipment, binding of the lids causes damage to the reusable container. One of the principal limitations on the life of the reusable container is container damage caused by defective lid operation. There is, therefore, a need for reusable containers fabricated from plastic sheeting with integral lids that do not bind or buckle when opened and closed. We have surprisingly discovered by using a crease as the hinge fold, hinge binding is eliminated and the bowing of the container sides is also substantially reduced. In addition, the lid when opened remains open and, surprisingly, the cracking of the hinge line between the lid and the container due to fatigue is lessened.

Briefly, the invention relates to a reusable container formed from plastic sheeting wherein the sheet is cut to the desired size by conventional cutting equipment to form a container blank. Desired slots and creases are formed in the blank by slotting and creasing rules on conventional container blank making machines. A curved crease is formed in the container blank for the lid hinges and the portion of the blank that serves as the bottom of the container is debossed to provide resiliency to the container bottom wall.

Accordingly, an object of this invention is to provide a reusable container fabricated from plastic sheeting that has a resilient bottom wall for supporting fragile articles.

Another object of this invention is to provide a reusable container fabricated from plastic sheeting having cured hinge creases formed therein.

A further object of this invention is to provide dividers for the container that have resilient side walls for protecting the fragile articles during shipment.

These and other objects and advantages of this invention will be more completely disclosed and described in the following specification, the accompanying drawings and the appended claims.

In the drawings:

FIGURE 2 is a plan view of a portion of a blank for the container of FIGURE 1.

FIGURE 3 is a plan view of an end wall blank for the container of FIGURE 1.

FIGURE 5 is a view in section taken along the lines 5—5 of FIGURE 2 illustrating a portion of the container bottom wall in section.

Figure 1:
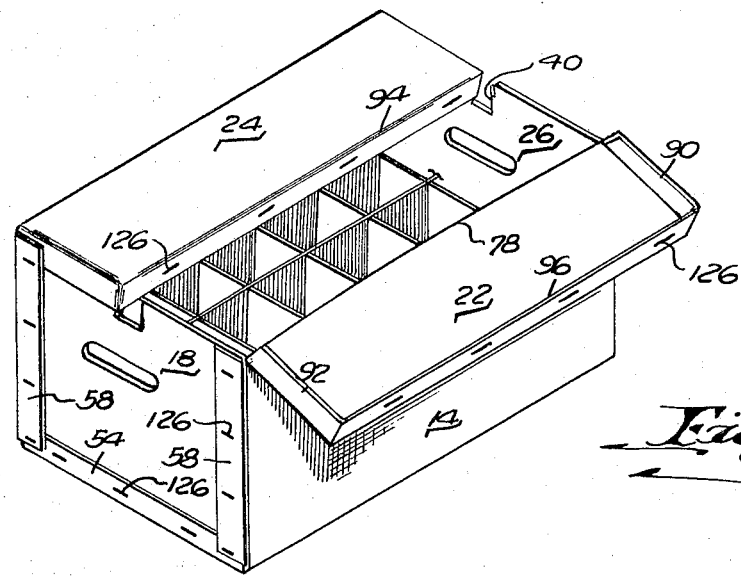
FIGURE 1 is a perspective view of an embodiment of a container fabricated from plastic sheeting according to the invention and having a concave curved hinge for the lid.

Throughout the specification the term "plastic sheeting" is intended to designate a flexible plastic sheet formed from polymeric materials such as polyethylene (both high and low density type), polypropylene, and other types of polymer sheeting that can be hot or cold creased and die cut. The thickness of the plastic sheeting is determined by the ultimate intended use of the container. Polyethylene sheets of 50 and 60 mil. thickness have been found suitable for use in containers for bottled beverages.

Referring to FIG. 2, a piece of polyethylene sheeting having 50 mil. thickness manufactured by the Sinclair-Koppers Company under the trademark "Super Dylan" is cut to the proper size on conventional thermoplastic cutting equipment. The sized sheet may be fed into conventional slotting and scoring equipment such as that used in the manufacture of conventional paperboard boxes and the sheet is cut, scored and creased to form the container blank. If desired, dies having cutting and scoring rules may be used to cut and crease the plastic sheet blank.

The sheet of "Super Dylan" polyethylene may be creased and die cut against a flat metal platen. The sheet need not be heated. When creased, the polyethylene sheet elongates and results in a crease with a sucked in area directly behind the creased area forming either a hinge or a fold. For a hinge, it has been found preferable to crease the polyethylene sheet to a depth of at least one-half the thickness of the sheet. This depth of crease forms an easy working hinge. The depth of the other crease folds should be at least one-third the thickness of the sheet of an acceptable 90° fold. It is preferred to use round faced creasing rules for forming the creases in the polyethylene plastic sheet.

The scored and creased box blank illustrated in FIG. 2 is generally designated by the numeral 10, and has a container bottom wall indicated by the numeral 12 and side walls 14 and 16. Since each side wall, end wall and lid portion has the same shape, similar numerals will be used to designate similar parts of the pairs of side walls, end walls and lid portions. A pair of lids 22 and 24 are formed integrally with the side walls 14 and 16.

The end walls 18 and 26 may be formed as a part of the blank 10 and then cut along the line 20 and separated from the remaining portion of the blank 10. As illustrated herein, one end wall 18 is shown as being still attached to a portion of blank 10, while the other end wall 26 is separated from blank 10 and is illustrated in FIG. 3. The end walls 18 and 26 are of the same dimensions, and each includes an elongated hand slot 28 and a pair of parallel fold creases 30 and 32. A vertical slot having sides 34 and 35 is formed transverse to the crease 30 to form a lid locking receiver for the depending lip portions of the lids, FIG. 7, and later described. The upper edge 36 of the end wall 18 has an inwardly extending slot 38 to form tongues 39 that mate with a portion of slot 34 to form the receiver 40 illustrated in FIGS. 1 and 8.

Figure 8:
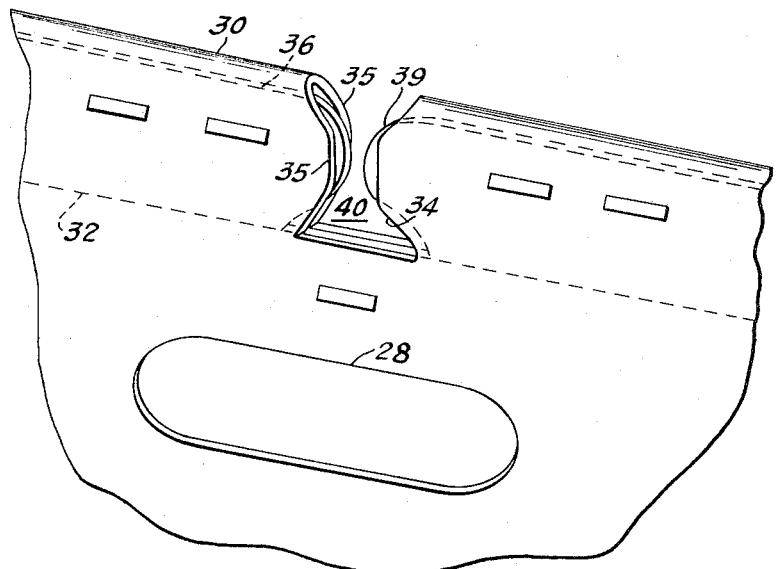
FIGURE 8 is an isometric detailed view of a side of a container.

The end wall 18 is formed by folding the sheet along crease 32 to position the slot 38 in overlying relation with a portion of slot 34. The end wall blank 18 is thereafter doubled back or folded along crease 30 and may be stapled in a folded position to provide rigidity along the upper edge of the end wall formed along crease 30. The double fold along the creases 30 and 32 provides a rigid cross member along the upper edge of the end walls 18 and 26. As illustrated in FIG. 8, tongues 39 project from sides 34 and 35 to provide locks for lids 22 and 24.

The blank 10 has a pair of transverse creases 42 and 44 that form the edges between the bottom wall 12 and the side walls 14 and 16. The blank 10 also has four transverse slots 46, 48, 50 and 52 extending inwardly from the side edges to provide clearance for the bottom end wall flaps 54 and 56 and the side wall end flaps 58 and 60 when the side walls 14 and 16 folded 90° in parallel planes normal to the container bottom wall 12.

A pair of parallel longitudinal creases 62 and 64 extend longitudinally adjacent to the edges of the blank 10 and define the end edge of the side walls 14 and 16 and the bottom wall 12. In assembly, the side walls 14 and 16 are folded along the creases 42 and 44 to a vertical position. Flaps 54 and 56 on bottom wall 12 are folded along creases 62 and 64 to a vertical position. Thereafter flaps 58 are folded inwardly in overlying relation with the end wall flaps 54 and 56 to provide rigidity for the free ends of the side walls 14 and 16 and the bottom wall 12. A portion of the flaps overlap adjacent the junction of the bottom wall 12 and side walls 14 and 16.

The side walls 14 and 16 have longitudinal four point impressions made along lines 66 and 68 to raise the outer surface of the side walls therebetween. Printing, decals and the like may be secured to the raised surfaces.

The bottom wall 12 has a plurality of debossed surface portions 70 that are illustrated in detail in FIG. 5. The debossed portions have a circular central aperture 72 and a pair of semicircular creases 74 and 76 arranged in diametrically opposed relation on opposite sides of the central aperture 72. The creases 74 and 76, as illustrated herein, are formed by a creasing rule (four point width) against a flat platen. The portion of plastic sheeting within in a circle defined by the semicircular creases 74 and 76 is punched and raised from the platen or underside to deform the plastic material into a semispherical portion with a central aperture therethrough. The raised plastic material between the creases 74 and 76 is more resilient than planar plastic sheeting and is deformable so that the raised portion is capable of absorbing shock loads imparted thereto.

The hinge crease 78 between the respective side wall and end flaps or lids 14 and 32 may be in either a straight line as indicated by center line 78S or a curved line as indicated by line 78C. The curved hinge crease 78C has a radius indicated by the line 80; for example, for a container having a 16″ length, a suitable radius of 512″ may be employed. We have found that a curved hinge crease minimizes or eliminates the buckling of the side walls 14 and 16 when the flaps 22 and 24 are open. The crease 78 is illustrated in FIG. 1 as a convex crease 78C curving toward the container bottom wall 12, but it should be understood that a concave crease such as that illustrated in FIG. 4 as crease 78C will function in a similar manner to minimize buckling of the side walls.

Figure 4:
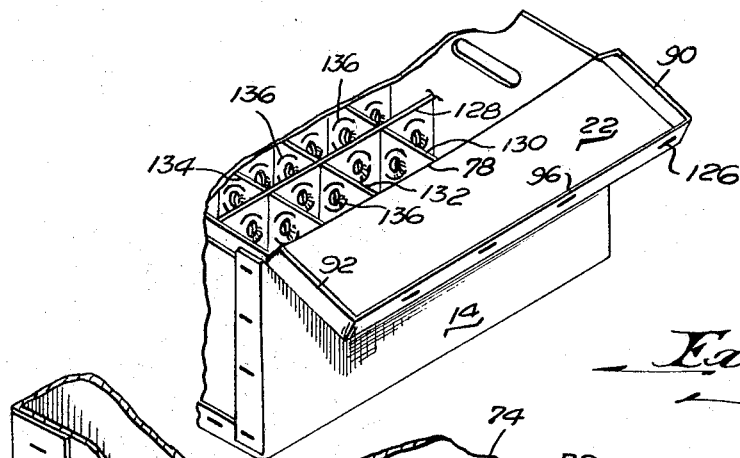
FIGURE 4 is a fragmentary perspective view of a container having a convex curved hinge for the lid and debossed divider strips positioned within the container.
Figure 6:
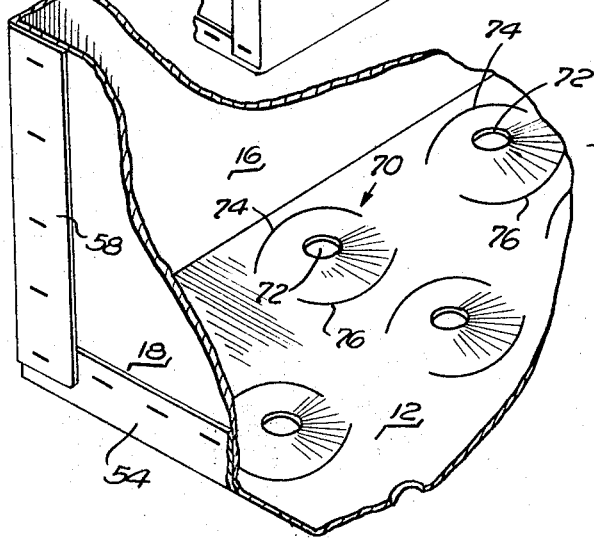
FIGURE 6 is another fragmentary perspective view of the container illustrating the debossed bottom wall.

The lids 22 and 24 each have a pair of indented or cut out portions 82 and 84 adjacent to the crease 78 to permit the depending side portions of the lids 22 and 24 to clear the side wall vertical edges formed along creases 62 and 64. The lids 22 and 24 have a pair of parallel longitudinal creases 86 and 88 adjacent the longitudinal edges of the blank 10. The creases 86 and 88 are spaced outwardly relative to the longitudinal creases 62 and 64 that form the inturned flaps for the side walls 14 and 16 and bottom wall 12 so that the lids 22 and 24 are slightly longer than the side walls 14 and 16, with this arrangement the down turned flaps 90 and 92 that are formed on the lids 22 and 24 by folding the lids along creases 86 and 88 clear the end walls 18 and 26 that are secured to the inturned flaps 58 and 60. The lids 22 and 24 have a pair of parallel creases 94 and 96 formed therein adjacent the lid end portion 98. There are triangular slotted portions 100 and 102 between the creases 94 and 96 that have an edge substantially aligned with the respective creases 86 and 88. The blank 10 has transverse slits 104 and 106 extending from the side edges of the lid blank into the adjacent slot 100 or 102. The portion of the lid between the crease 96 and the end 98 has longitudinal creases 108 and 110. With this arrangement, rectangular portions 112 and 114 are free to be folded and connected to other portions of the lid flange 90 and 92. The lid flaps 90 and 92 have angular creases 116 and 118 that provide a fold crease for the flap portions 120 and 122. The lid end portion 98 has perforated slots 124 that assist in maintaining the lids in a closed and locked position. With this arrangement the lids 20 and 24 are provided with a peripheral depending flap as illustrated in FIGS. 1 and 4. If desired, portions 112 and 114 can be entirely cut away at 108 and 110 and removed and this embodiment is illustrated in FIG. 7.

The perspective views in FIGS. 1 and 4 illustrate the side flaps 90 and 92 of reduced dimension when compared with the blank illustrated in FIG. 2. It should be understood that the dimension of the side flaps may be varied by varying the dimension of the blank between the crease 86 and the longitudinal edge of the lid portion of the blank.

The lids 22 and 24 are assembled by making a 180° fold at crease 96 so that the portion between the crease 96 and the edge 98 is in overlying relation with the portion of the lid between crease 94 and 96. A 90° fold is then made along crease 94 and the edge along crease 96 forms the depending longitudinal edge of the lids 22 and 24. A 90° fold is made along creases 86 and 88 so that the flaps 90 and 92 form the depending side edges of the lids 22 and 24. The rectangular portions 112 and 114 are folded along the respective creases 108 and 110 in either underlying or overlying relation with the depending side flaps 86 and 88. Similarly, the flap portions 120 and 122 are folded in overlying relation with the depending longitudinal edge portion of the lids 22 and 24. Staples or other suitable securing means are used to maintain the folded portions of the lids 22 and 24 in the rectangular position illustrated in FIGS. 1 and 2.

Figure 7:
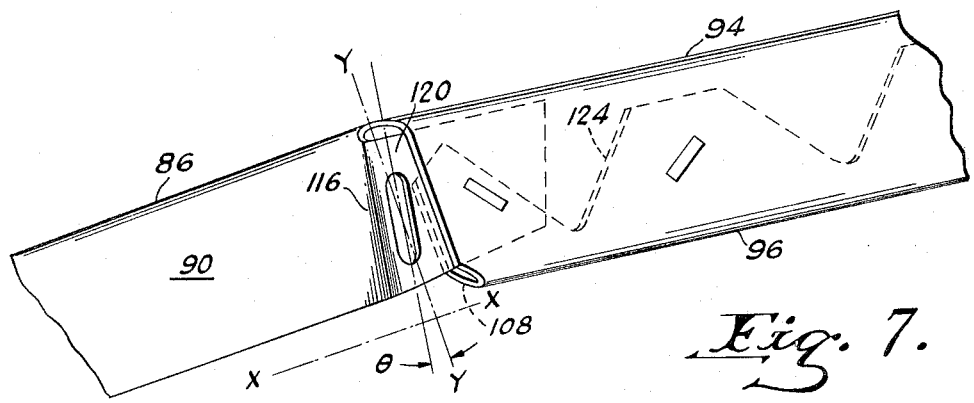
FIGURE 7 is an isometric detailed view of a lid of a container.

Referring to FIG. 7, the slant of lines 116 and 118 provides for a locking of the lid. As shown there, the X—X axis is parallel to the side line 86 of the lid and the Y—Y axis is perpendicular thereto. As flaps 120 and 122 are folded along lines 116 and 118 they tend to slant at an angle $\theta$ and thus apertures 121 and 123 tend to lock with tongues 39 as the lid is closed and thus remains closed.

The container is assembled by folding the side walls 14 and 16 along the creases 42 and 44 and folding inwardly the respective flaps 54, 56, 58 and 60. The end walls 18 and 26 with the double fold on creases 30 and 32 are positioned in abutting relation with the inner surface of the flaps 54, 56, 58 and 60 and are stapled or otherwise secured thereto, as is clearly shown in FIG. 1. The lids 22 and 24 have the depending edge portions formed thereon in the previously described manner. The container lids 22 and 24 are then folded along the curved hinge creases 78 and the depending edge portions are positioned in the lid locking receiver 40 formed in the end walls by slots 34. For illustrative purposes, staples 126 are illustrated as securing the side wall and bottom wall flaps 58 and 54 to the end wall 18. It should be understood that other means of securing the end walls to the flaps may be utilized as, for example, the flaps 54 and 56 may be heat sealed to the end wall 18 or an ultrasonic generator may be utilized to secure the separate members of the container in assembled condition.

It is also within the scope of this invention to provide suitable dovetail joints in the side wall and bottom wall flaps and the end walls to interlock the pieces of the container to each other without the use of metal staples or heat seals.

Where the container is utilized as a container for transporting fragile articles such as eggs or the like it may be desirable to position cushioning dividers between the fragile articles. In FIG. 4 longitudinal dividers 128 and transverse dividers 130, 132 and 134 provide rectangular compartments for the fragile articles. The rectangular dividers may be fabricated from the same plastic sheeting used for the external portions of the container or they may be fabricated from a thinner plastic sheeting. The container dividers have debossed portions 136 similar to the debossed portions in the container bottom wall 12. The debossed portions provide a resilient shock absorbing property for the dividers so that fragile articles can be safely transported in the container without incurring breakage during shipment under normal handling conditions.

The slotted configuration of the lid receiver 40 provides a suitable locking device for the lid depending edge portions so that the containers may be safely carried in one hand without the lid coming open.

Because of the relatively slippery characteristics of plastic sheeting, it may be desirable to flame treat the exposed surface of the bottom wall 12 and spray on an antiskid adhesive material.

Figure 9:
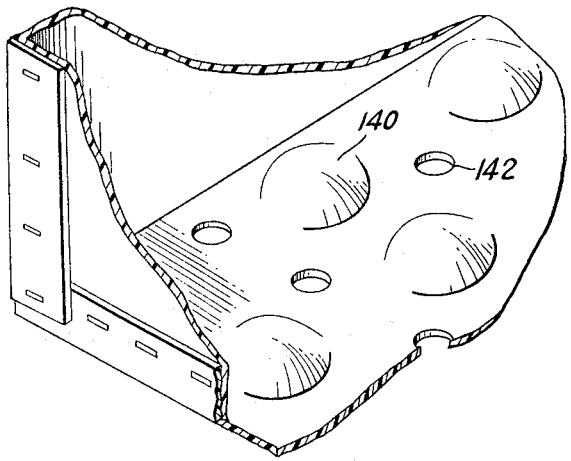
FIGURE 9 is an isometric view of the bottom of a container with portions broken away.

Since the container can be washed, sterilized and reused, it is desirable that the container be capable of draining. In the embodiment of FIG. 9, the floor or bottom of the container is bossed as at 140 and apertures 142 are provided between the raised or bossed portions.

From the above it will be apparent that a reusable plastic container can readily be fabricated from sheets of plastic such as polyethylene, polypropylene and polystyrene. The containers fabricated from the plastic sheeting have improved shock absorbing characteristics that permit the containers to be used in automatic loading machinery wherein fragile articles are dropped into the containers from heights of between 12" and 18" without breaking the fragile articles. The dividers within the container also have improved shock absorbing characteristics so that articles transported in the plastic containers are not subject to breakage under normal handling conditions. When the hinge for the container lids is curved and has a semicircular configuration, buckling of the side walls of the container is minimized when the lids are opened and closed. The hinges so formed have excellent strength and are capable of withstanding between 4,000 and 10,000 180° folds under one kilogram tension, thereby providing an extended useful life of both the lid hinge and the container.

The external surfaces of the plastic sheeting may be printed by means of conventional printing techniques after the external surface is flame treated, electrically treated or dipped in an oxidizing solution. The inks applied by conventional printing techniques have exhibited excellent adhesion and abrasion resistance. The inks applied in this manner have also withstood sterilization temperatures.

According to the provisions of the patent statutes, we have explained the principle, preferred construction, and mode of operation of our invention and have illustrated and described what we now consider to represent its best embodiments. However, we desire to have it understood that, within the scope of the appended claims, the invention may be practiced otherwise than as specifically illustrated and described.

What is claimed is:

1. In a container formed from plastic sheeting the combination comprising,
   a shaped plastic sheet container blank having a pair of spaced parallel transverse creases defining a container bottom wall and a pair of container side walls on opposite sides of said bottom wall,
   a pair of spaced transverse curved hinge creases in said plastic sheet container blank located on opposite sides of said parallel creases forming a pair of lids hingedly secured to said side walls,
   a pair of separate rectangular end walls formed from a plastic sheet,
   said container blank having 90° folds at said spaced parallel creases so that said side walls extend upwardly from said bottom wall,
   said end walls secured to the edge portions of said bottom wall and said side walls to form a rectangular container, and
   said lid portions folded 90° along said curved hinge creases to enclose said rectangular container, said curved hinge creases operable to maintain said side walls substantially planar with said lid portions in an open position.

2. In a container as set forth in claim 1 in which said container bottom wall has a plurality of debossed portions extending upwardly into said container,
   said debossed portions being deformable under impact loads and operable to serve as a cushioning means on the bottom wall of said container.

3. In a container as set forth in claim 1 in which said hinge creases have a radius of curvature about 32 times the length of said hinge crease.

4. In a container as set forth in claim 1 in which said hinge creases have a depth of about one-half the thickness of said plastic sheet.

5. In a container as set forth in claim 1 in which said pair of spaced parallel creases defining said container bottom wall and said side walls have a depth of about one third the thickness of said plastic sheet.

6. In a container as set forth in claim 1 in which said curved hinge creases form convex curved hinges extending toward the internal portion of said container.

7. In a container as set forth in claim 1 in which said plastic sheeting is polyethylene having a thickness of about 50 mils.

8. In a container formed from plastic sheeting the combination comprising, a shaped plastic sheet container blank having a pair of spaced parallel transverse creases defining a container bottom wall and a pair of container side walls on opposite sides of said bottom wall, a pair of longitudinal creases adjacent the longitudinal edges of said container blank and defining end flap portions for said bottom wall and said side walls, said transverse and longitudinal creases having a depth of about one third the thickness of said plastic sheet, a pair of spaced transverse curved hinge creases in said plastic sheet container blank located on opposite sides of said parallel transverse creases and forming a pair of lids hingedly secured to said side walls, said curved hinge creases having a depth of about one-half the thickness of said sheet and a radius of curvature about 32 times the length of said hinge crease, a pair of separate rectangular end walls formed from said plastic sheeting, said container having 90° folds at said spaced parallel transverse creases so that said side walls extend upwardly from said bottom wall and 90° folds at said longitudinal creases so that said end flap portions extend inwardly toward each other in the same transverse plane, said end walls secured to said inturned flaps on said bottom walls and said side walls to form a rectangular container, and said lid portions folded 90° along said curved hinge creases to enclose said rectangular container, said curved hinge creases operable to maintain said side walls substantially planar with said container in a lid open position.

9. In a container as set forth in claim 8 in which said lid portions have a width about one-half the width of said bottom wall and peripheral depending edge portions, said end walls having upwardly extending intermediate slotted portions operable to receive portions of said lid depending edge portions therein and lock said lid portions in a closed position.

10. In a container as set forth in claim 8 in which said container bottom wall has a plurality of deformable resilient upwardly raised portions.

11. In a container formed from substantially planar plastic sheeting, a surface having an aperture therethrough, a pair of semicircular creases in said surface on opposite sides of said aperture, said sheeting between said semicircular creases and said aperture forming a substantially semispherical raised portion in said surface, said semispherical raised portion forming a resilient deformable surface operable to serve as a cushioning means for articles within said container.

12. In a container formed from plastic sheeting, the combination comprising, a shaped plastic sheet container blank having a pair of spaced parallel transverse creases defining a container bottom wall and a pair of container side walls on opposite sides of said bottom wall, a pair of spaced transverse hinge creases in said plastic sheet container blank located on opposite sides of said parallel creases forming a pair of lids hingedly secured to said side walls, a pair of separate rectangular end walls formed from a plastic sheet, said container blank having 90° folds at said spaced parallel creases so that said side walls extend upwardly from said bottom wall, said end walls secured to the edge portions of said bottom wall and said side walls to form a rectangular container, and said lid portions folded 90° along said hinge creases to enclose said rectangular container, said hinge creases operable to maintain said side walls substantially planar with said lid portions in an open position.

References Cited by the Examiner
UNITED STATES PATENTS

| | | | |
|---|---|---|---|
| 514,032 | 2/1894 | Reber et al. | 229—29 |
| 2,124,326 | 7/1938 | Williams | 229—44 |
| 2,415,869 | 2/1947 | Coleman | 229—37 |
| 2,544,565 | 3/1951 | Phillips | 229—45 X |
| 2,589,022 | 3/1952 | Page et al. | 229—3.5 X |
| 2,612,305 | 9/1952 | Klasing et al. | 229—44 X |
| 2,743,030 | 4/1956 | Read | 220—21 |
| 3,055,542 | 9/1962 | Russo | 220—104 |
| 3,148,822 | 9/1964 | Yochum | 229—3.5 X |
| 3,222,437 | 12/1965 | Schilling | 264—54 |

GEORGE O. RALSTON, *Primary Examiner.*